US010544819B2

(12) United States Patent
Philbrick et al.

(10) Patent No.: US 10,544,819 B2
(45) Date of Patent: Jan. 28, 2020

(54) REDUCED WINDAGE FASTENER ASSEMBLY FOR A GAS TURBINE ENGINE

(71) Applicant: United Technologies Corporation, Hartford, CT (US)

(72) Inventors: Graham R. Philbrick, Vernon, CT (US); Jon P. Heslin, Meriden, CT (US)

(73) Assignee: United Technologies Corporation, Farmington, CT (US)

( * ) Notice: Subject to any disclaimer, the term of this patent is extended or adjusted under 35 U.S.C. 154(b) by 1184 days.

(21) Appl. No.: 14/842,498

(22) Filed: Sep. 1, 2015

(65) Prior Publication Data

US 2016/0069267 A1    Mar. 10, 2016

Related U.S. Application Data

(60) Provisional application No. 62/046,562, filed on Sep. 5, 2014.

(51) Int. Cl.
*F16B 39/02*        (2006.01)

(52) U.S. Cl.
CPC ................. *F16B 39/021* (2013.01)

(58) Field of Classification Search
CPC ...... F01D 25/00; F01D 5/027; F05D 2250/62; F05D 2260/31; F05D 2260/97; Y02T 50/673; F16B 5/0208; F16B 41/002; F16B 2043/008; F16B 39/021; F16B 5/02; A47G 3/00
USPC .............. 416/144, 241 B; 248/200; 411/349, 411/372.6
See application file for complete search history.

(56) References Cited

U.S. PATENT DOCUMENTS

| 3,465,803 | A | * | 9/1969 | Swanstrom | F16B 5/0208 411/349 |
|---|---|---|---|---|---|
| 3,737,075 | A | * | 6/1973 | Atchley | A47G 19/24 222/142.9 |
| 6,302,630 | B1 | * | 10/2001 | Grant | A47G 3/00 411/372.6 |
| 7,104,756 | B2 | | 9/2006 | Harding et al. | |
| 7,153,054 | B2 | | 12/2006 | Arbona | |
| 7,261,489 | B2 | | 8/2007 | Arbona et al. | |
| 7,581,301 | B2 | | 9/2009 | Arbona et al. | |
| 8,191,224 | B2 | | 6/2012 | Richards | |
| 8,607,577 | B2 | | 12/2013 | Ruberte Sanchez et al. | |
| 8,747,054 | B2 | | 6/2014 | Witlicki | |
| 8,763,627 | B2 | | 7/2014 | Richards | |
| 9,033,631 | B2 | | 5/2015 | Greenberg et al. | |
| 2012/0163986 | A1 | * | 6/2012 | Darkins, Jr. | F01D 5/282 416/241 B |

(Continued)

*Primary Examiner* — Mark A Laurenzi
*Assistant Examiner* — Paul W Thiede
(74) *Attorney, Agent, or Firm* — O'Shea Getz P.C.

(57) ABSTRACT

A fastener assembly for a gas turbine engine, and method of assembly, includes a first body having a first surface and a recess communicating through the first surface. The recess may be defined by a bottom surface and a side face spanning between the first and bottom surfaces. A shank of the assembly is generally engaged between the first body and a second body and includes opposite first and second end portions. The first end portion is located in the recess and the second end portion is engaged to the second body. A filler of the assembly is generally located in the recess to cover the first end portion. To reduce windage, the filler has an outer surface that is substantially flush with the first surface.

13 Claims, 4 Drawing Sheets

(56) References Cited

U.S. PATENT DOCUMENTS

2014/0014792 A1* 1/2014 Willis ................ F16B 41/002
                                                              248/200
2015/0226116 A1    8/2015 Major et al.

* cited by examiner

REDUCED WINDAGE FASTENER ASSEMBLY FOR A GAS TURBINE ENGINE

This application claims priority to U.S. Patent Appln. No. 62/046,562 filed Sep. 5, 2014.

BACKGROUND

The present disclosure relates to a gas turbine engine and, more particularly, to reduced windage fastener assemblies for the gas turbine engine.

Gas turbine engines are known to have structures that define internal flow passages and other structures (e.g. rotor discs) that move or rotate about a central axis. A variety of fasteners are utilized to connect the various structures and typically protrude into the flow passages and/or project outward from the rotating structures. Such fastener projections from moving parts and/or fastener obstructions into flowpaths creates excessive windage and or drag that hinders engine performance.

SUMMARY

A fastener assembly for a gas turbine engine according to one, non-limiting, embodiment includes a first body including a first surface, a bottom surface and a side face spanning between the first and bottom surfaces, and wherein the first surface, the bottom surface and the side face define a recess in the first body; a second body; a shank engaged between the first and second bodies and including opposite first and second end portions with the first end portion disposed in the recess and the second end portion engaged to the second body; and a filler disposed in the recess and engaged between the first body and the first end portion, and wherein the filler has an outer surface orientated flush with the first surface.

Additionally to the foregoing embodiment, the assembly includes an enlarged head engaged to the first end portion, disposed in the recess and covered by the filler.

In the alternative or additionally thereto, in the foregoing embodiment, the first body is a rotor.

In the alternative or additionally thereto, in the foregoing embodiment, the second body is a balancing weight.

In the alternative or additionally thereto, in the foregoing embodiment, the enlarged head is a nut in contact with the bottom surface and the first end portion is threaded.

In the alternative or additionally thereto, in the foregoing embodiment, the first and second bodies are static structures and at least the first surface defines at least in-part an air flowpath.

In the alternative or additionally thereto, in the foregoing embodiment, a hole in the first body extends through the bottom surface and communicates with the recess, and the shank extends through the hole.

In the alternative or additionally thereto, in the foregoing embodiment, the air flowpath is a secondary cooling air flowpath.

In the alternative or additionally thereto, in the foregoing embodiment, the assembly includes a second enlarged head engaged to the second end portion, and wherein a portion of the second body is located between and in contact with the second enlarged head and the first body.

In the alternative or additionally thereto, in the foregoing embodiment, the first body is a rotor and the second body is a balancing weight.

A rotor assembly according to another, non-limiting, embodiment includes a first surface defining in-part an air cavity through which the rotor rotates; a second surface recessed from the first surface with a hole in the rotor that extends through the second surface; a shank extending through the hole and having a first end portion disposed between the first and second surfaces and an opposite second end portion; a body engaged to the second end portion; an enlarged head engaged to the first end portion and disposed between the first and second surfaces; and a filler disposed between the first and second surfaces, covering the enlarged head and the first end portion, and having an outer surface orientated flush with the first surface and defining in-part the air cavity.

Additionally to the foregoing embodiment, the body is a balancing weight.

In the alternative or additionally thereto, in the foregoing embodiment, the rotor assembly includes a side face spanning between the first and second surfaces, and wherein a recess in the rotor disc is defined by the second surface and the side face.

In the alternative or additionally thereto, in the foregoing embodiment, the side face is circumferentially continuous with respect to a centerline of the hole.

In the alternative or additionally thereto, in the foregoing embodiment, the filler is removable.

A method of assembling a fastener assembly for a gas turbine engine according to another, non-limiting, embodiment includes the steps locating a first end portion of a shank into a recess in a first body of a gas turbine; and filling the recess with a filler such that the filler is flush with the body.

Additionally to the foregoing embodiment, the method includes the steps of attaching an enlarged head to the first end portion; and covering the head with the filler.

In the alternative or additionally thereto, in the foregoing embodiment, the method includes the step of attaching a second body to a second distal end of the shaft not in the recess.

In the alternative or additionally thereto, in the foregoing embodiment, the first body is a rotor.

In the alternative or additionally thereto, in the foregoing embodiment, the first and second bodies are static structures.

The foregoing features and elements may be combined in various combinations without exclusivity, unless expressly indicated otherwise. These features and elements as well as the operation thereof will become more apparent in light of the following description and the accompanying drawings. It should be understood, however, the following description and figures are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
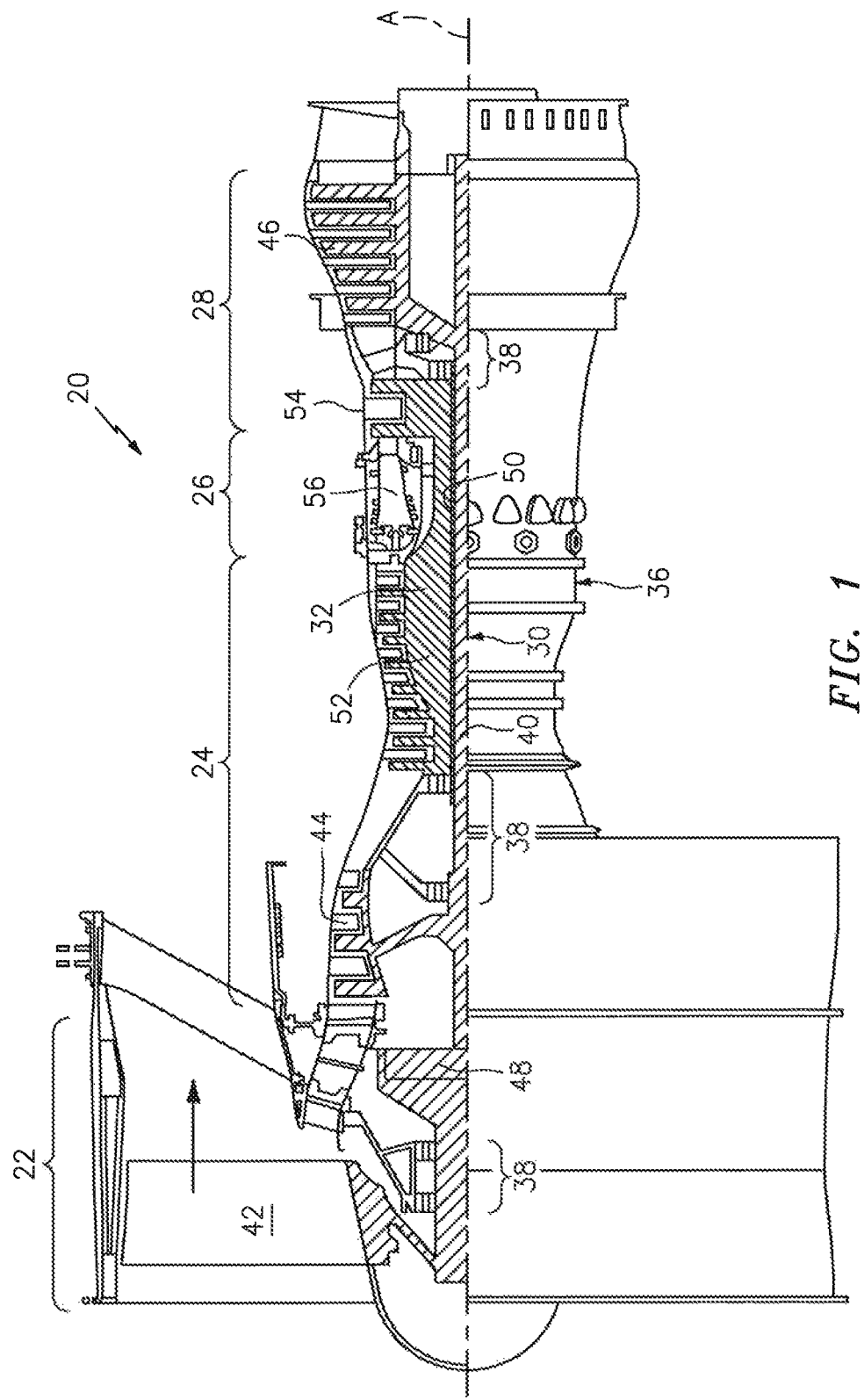
FIG. 1 is a schematic cross section of a gas turbine engine.

FIG. 1 schematically illustrates a gas turbine engine 20 disclosed as a two-spool turbo fan that generally incorporates a fan section 22, a compressor section 24, a combustor section 26 and a turbine section 28. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be understood that the concepts described herein are not limited to use with turbofans as the teachings may be applied to other types of turbine engine architecture such as turbojets, turboshafts, three-spool turbofans, land-based turbine engines, and others.

The engine 20 generally includes a low spool 30 and a high spool 32 mounted for rotation about an engine axis A via several bearing structures 38 and relative to a static engine case 36. The low spool 30 generally includes an inner shaft 40 that interconnects a fan 42 of the fan section 22, a low pressure compressor 44 ("LPC") of the compressor section 24 and a low pressure turbine 46 ("LPT") of the turbine section 28. The inner shaft 40 drives the fan 42 directly, or, through a geared architecture 48 to drive the fan 42 at a lower speed than the low spool 30. An exemplary reduction transmission may be an epicyclic transmission, namely a planetary or star gear system.

The high spool 32 includes an outer shaft 50 that interconnects a high pressure compressor 52 ("HPC") of the compressor section 24 and a high pressure turbine 54 ("HPT") of the turbine section 28. A combustor 56 of the combustor section 26 is arranged between the HPC 52 and the HPT 54. The inner shaft 40 and the outer shaft 50 are concentric and rotate about the engine axis A. Core airflow is compressed by the LPC 44 then the HPC 52, mixed with the fuel and burned in the combustor 56, then expanded over the HPT 54 and the LPT 46. The LPT 46 and HPT 54 rotationally drive the respective low spool 30 and high spool 32 in response to the expansion.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3:1, and in another example is greater than about 2.5:1. The geared turbofan enables operation of the low spool 30 at higher speeds that can increase the operational efficiency of the LPC 44 and LPT 46 and render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting example, the bypass ratio of the gas turbine engine 20 is greater than about ten (10:1); the fan diameter is significantly larger than the LPC 44; and the LPT 46 has a pressure ratio that is greater than about five (5:1). It should be understood; however, that the above parameters are only exemplary of one example of a geared architecture engine and that the present disclosure is applicable to other gas turbine engines including direct drive turbofans.

In one non-limiting example, a significant amount of thrust is provided by the bypass flow path B due to the high bypass ratio. The fan section 22 of the gas turbine engine 20 is designed for a particular flight condition typically cruise at about 0.8 Mach and about 35,000 feet (10,668 meters). This flight condition, with the gas turbine engine 20 at its best fuel consumption, is also known as Thrust Specific Fuel consumption (TSFC). TSFC is an industry standard parameter of fuel consumption per unit of thrust.

Fan Pressure Ratio is the pressure ratio across a blade of the fan section 22 without the use of a fan exit guide vane system. The low Fan Pressure Ratio according to one, non-limiting, example of the gas turbine engine 20 is less than 1.45:1. Low Corrected Fan Tip Speed is the actual fan tip speed divided by an industry standard temperature correction of $(T/518.7)^{0.5}$, where "T" represents the ambient temperature in degrees Rankine. The Low Corrected Fan Tip Speed according to one non-limiting example of the gas turbine engine 20 is less than about 1,150 feet per second (351 meters per second).

Figure 2:
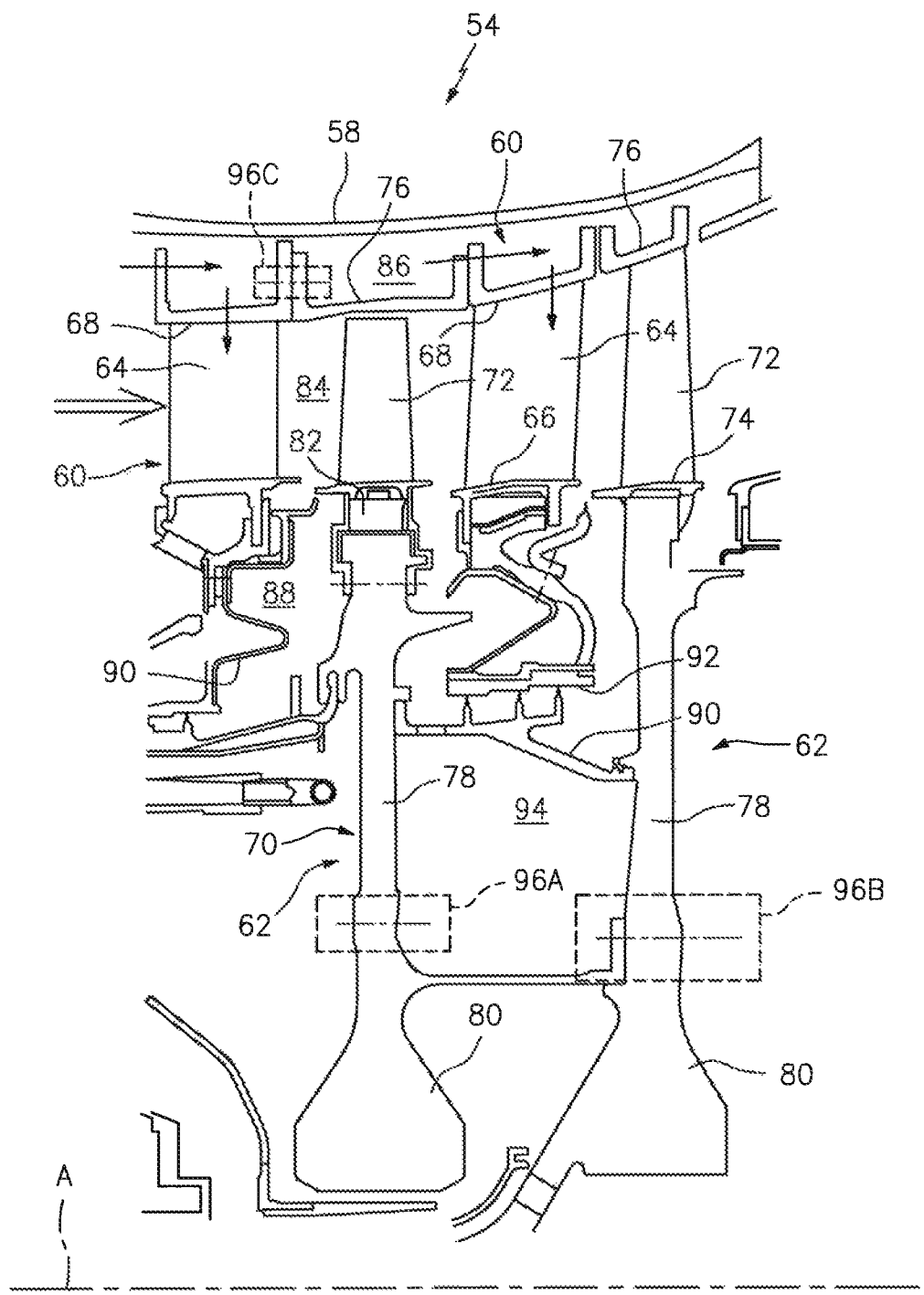
FIG. 2 is partial cross section of a high pressure turbine of the engine illustrating different applications of a fastener assembly of the present disclosure.

Referring to FIG. 2, a portion of the HPT 54 of the turbine section 28 is illustrated as one, non-limiting, application of the present disclosure. The HPT 54 includes a radially outer casing 58 and a plurality of stages, with each stage having stator assemblies 60, a rotor assembly 62. The stator assembly 60 includes a plurality of circumferentially spaced vanes 64 with each vane spanning radially between inner and outer platforms 66, 68 in a ring-shaped formation about the axis A. The rotor assembly 62 includes a rotor disc 70, a plurality of circumferentially spaced blades 72 spanning radially outward from a platform 74, and a ring-shaped spacer 76 spanning axially between the outer platforms 68 of the vanes 64. The rotor disc 70 may have a web 78 spanning radially between a hub 80 that is engaged to the outer shaft 50 and a rim 82 that generally connects to the platforms 74 of the blades 72.

The vanes 64 and blades 72 are in an annular core flowpath 84 defined radially outward by the outer platforms 68 of the multiple stator assemblies 60 and the spacers 76 of the multiple rotor assemblies 62, and radially inward by the inner platforms of the stator assemblies 60 and the platforms 74 of the rotor assemblies 62. Hot combustion gases flow through the HPT 54 where energy is extracted and turned to work through the rotation of the rotor discs 70 and shaft 50 (see FIG. 1). A generally annular, secondary, or outer cooling flowpath 86 may generally be defined radially outward by the casing 58 and radially inward by the outer platforms 68 of the stator assemblies 60 and the spacers 76 of the rotor assemblies 62. Cooling air may flow through the outer cooling flowpath 86 to cool, as one non-limiting example, the vanes 64 and surrounding structure. A generally annular, secondary, or inner cooling flowpath 88 is generally defined radially outward by the inner platforms 66 of the stator assemblies 60 and the platforms 74 of the rotor assemblies 62, and radially inward by a variety of structures 90 that support multiple seals 92 for generally sealing between static and rotating parts. Cooling air flows through the inner cooling flowpath 88 to generally cool the vanes 64, blades 72 and surrounding structures.

A cavity or rotor bore 94 is defined axially between adjacent webs 78 of the rotor discs 70 and radially between the shaft 50 and the structures 90. Relative to the outer and inner cooling flowpaths 86, 88, there is generally minimum airflow through the rotor bores 94 to at least ventilate the bores. This ventilation may be facilitated through air flow received from the inner flowpath 88 as one, non-limiting, example.

More specific to the present disclosure, the HPT 54, as one, non-limiting, example, may include a fastener assembly 96 that reduces windage on moving parts utilizing the assembly 96, and/or reduces windage in a flowpath defined by static structures utilizing the assembly 96. As illustrated in FIG. 2, three applications of the fastener assembly 96 is illustrated as, non-limiting, examples. Generally, fastener assembly 96A connects a balancing weight 96 see FIG. 3) to the web 78 of the rotor disc 70 in the rotor bore 94. Fastener assembly 96B may connect a cantilevered flange of one rotor disc 70 to the web 78 of the next adjacent rotor disc 70. Fastener assembly 96C is generally located in the outer cooling flowpath 86 and may connect the static outer platform 68 of the stator assembly 60 to the adjacent spacer 76 of the rotor assembly 62. The aerodynamic design of assemblies 96A, 96B, 96C reduces windage when compared to more traditional designs of protruding nut and bolt configurations. By reducing windage, or drag, engine power, performance and TSFC is enhanced. It is further contemplated and understood that the fastener assembly 96 may be utilized at any location in the turbine engine where there is either a moving fluid, such as air, or moving parts such as, for example, the compressor section 24.

Figure 3:
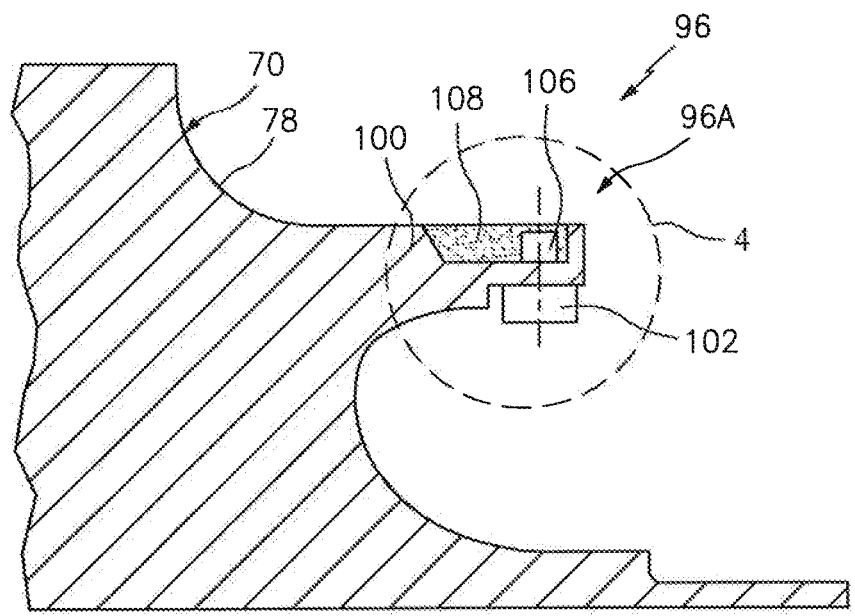
FIG. 3 is a cross section of the fastener assembly applied to a rotor disc of the high pressure turbine.
Figure 4:
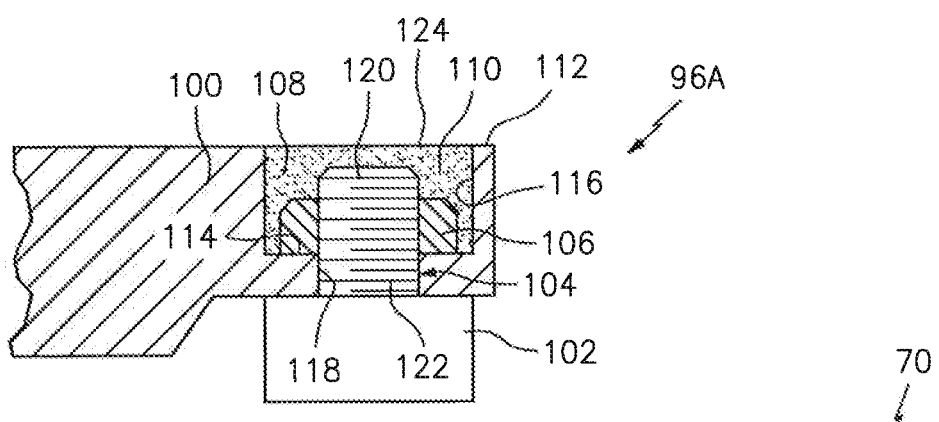
FIG. 4 is an enlarged cross section of the fastener assembly taken from circle 4 of FIG. 3.
Figure 5:
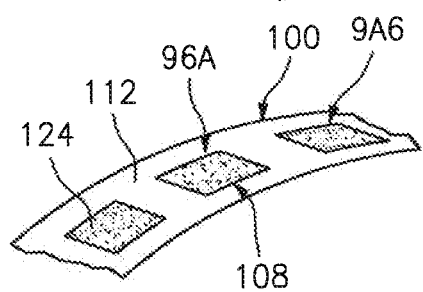
FIG. 5 is a partial plan view of the rotor disc illustrating a plurality of fastener assemblies.

Referring to FIGS. 3 through 5, the fastener assembly 96 may include first and second bodies 100, 102, a shank 104 extending through at least one of the bodies 100, 102, an enlarged head 106 that may be removably engaged to the shank 104, and a filler 108 that generally covers the enlarged head 106. A recess 110 is in the first body 100 and communicates through an outer surface 112 of the body 100. The recess 110 is defined by a bottom surface 114 that may substantially face in the same direction as the outer surface 112, and a continuous side face 116 that spans between the bottom surface 114 and the outer surface 112. A hole 118 in the first body 100 may extend through the bottom surface 114 and thus communicate with the recess 110.

The shank 104 may extend through the hole 118 and have opposite first and second end portions 120, 122. The first end portion 120 is located in the recess 110 and the second end portion 122 is generally engaged to the second body 102. The enlarged head 106 may be a nut threadably engaged to threads formed on the first end portion 120. The filler 108 may substantially fill the recess 110, and thus covers the nut 106 and the threaded first end portion 120. The filler 108 may generally be any compound capable of being applied in a liquid state to adequately fill the recess and bury the nut 106. When the assembly 96 is fully assembled, an outer surface 124 of the filler 108 is substantially flush with the outer surface 112 of the first body 100 to enhance aerodynamics thus minimize or eliminate windage. This flush relationship may be formed or manufactured through machining after the filler cures or dries, or the fluid consistency of the filler, prior to curing, may be such that the filler is self-leveling. During engine maintenance procedures, the filler 108 may be removed mechanically (i.e. through conventional machining) or chemically, depending upon the filler composition.

The filler 108 is made of a material capable of handling the surrounding environment. Materials may include, as non-limiting examples, any one or combination of: ceramics, metallics (such as Nickel, Titanium and Cobalt based metals), metallic alloys, and high temperature polymers. For fillers 108 used in the compressor section 24, temperature resistance is less of a concern when compared to the turbine section 28; therefore, filler materials may further include, as non-limiting examples, rubbers, polymers, Teflon and other materials when located in the compressor section 24.

With respect to the fastener assembly 96A, the first body 100 may be an annular and cantilevered portion of the web 78 of the rotating rotor disc 70 and the second body 102 may be a balancing weight. A plurality of assemblies 96A may be circumferentially spaced about the first body 100 with each respective balancing weight 102 being of a pre-determined weight to properly balance the rotor assembly 62.

Figure 6:
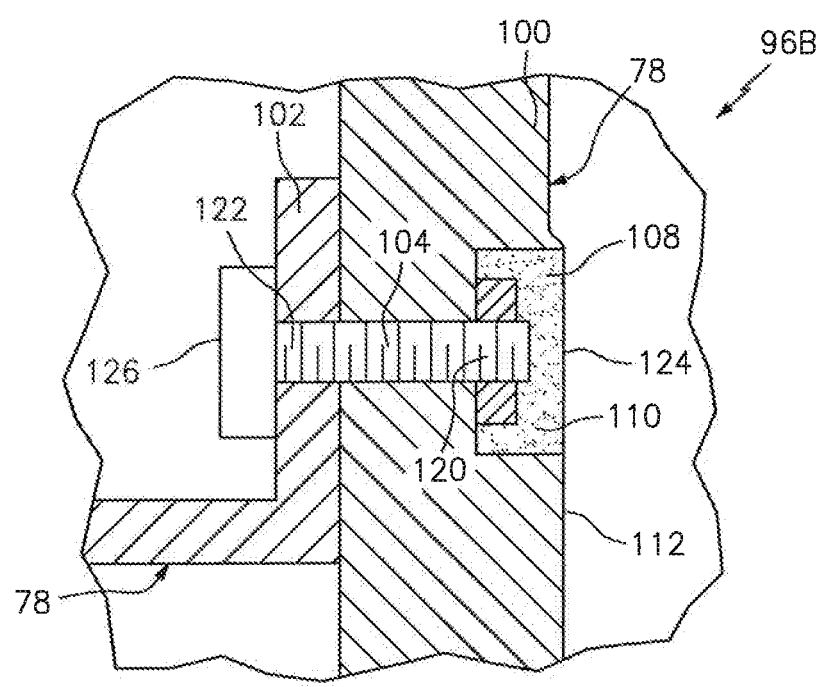
FIG. 6 is a cross section of a second embodiment of the fastener assembly.

Referring to FIG. 6 and with respect to the fastener assembly 96B, the first body 100 may be a portion of the web 78 of the rotor disc 70 and the second body 102 may be an annular and cantilevered flange portion of the web 78. The shank 104 may be a threaded bolt having a second enlarged head 126 that is threaded to or otherwise engaged as one unitary piece to the distal end of the second end portion 122 of the shank 104. When the fastener assembly 96B is assembled, the flange portion 102 of the web 78 and the next adjacent web 78 are generally located between the head 126 and the threaded nut 106. The flange portion 102 and the adjacent web 78 are in biased contact with one-another through torqueing of the nut 106. Like assembly 96A, the nut 106 is covered with the filler 108. It is further contemplated and understood that the enlarged head 126 and the second end portion 122 may be disposed in a second recess (not shown) in the flange portion 102 and covered with a filler to achieve an overall flush and aerodynamic shape of an outer surface of the flange portion 102.

Referring again to FIG. 2, the fastener assembly 96C may generally be similar to assembly 96B except that the fastener is associated with static parts (that at least in-part define the flowpath 86) instead of rotating parts (e.g. rotor disc). That is, similar advantages to windage reduction may be achieved on static parts exposed to a flowpath by improving the efficiency of air flow as oppose to the movement or rotation of the connected parts themselves. With respect to assembly 96C, the first body may be a portion of the outer platform 68 of the stator assembly 60 and the second body may be a portion of the spacer 76 of the rotor assembly 62.

A method of assembling the fastener assembly 96 may generally include inserting the first end portion 120 of the shank 104 through the hole 118 and into the recess 110 in the first body 100. A next step may include attaching or threading the enlarged head 106 onto the first end portion 120 and such that the head is located in the recess 110. The recess 110 may then be filled with the filler 108 such that the head 106 and the end portion 120 are covered by the filler. If the filler 108 is not self-leveling, the filler may then be machined or otherwise smoothed to achieving a flush surface between the filler and the body 100. In some applications, the method may further include attaching the second body 102 to the second end portion 122 of the shank 104 either prior to shank insertion or after. Furthermore, if the shank 104 is part of a bolt and the enlarged head 106 is a nut, the method may include inserting the shank through the second body 102 and then through the first body 100, and then torqueing the nut 106 to a prescribed value.

It is understood that relative positional terms such as "forward," "aft," "upper," "lower," "above," "below," and the like are with reference to the normal operational attitude and should not be considered otherwise limiting. It is also understood that like reference numerals identify corresponding or similar elements throughout the several drawings. It should be understood that although a particular component arrangement is disclosed in the illustrated embodiment, other arrangements will also benefit. Although particular step sequences may be shown, described, and claimed, it is understood that steps may be performed in any order, separated or combined unless otherwise indicated and will still benefit from the present disclosure.

The foregoing description is exemplary rather than defined by the limitations described. Various non-limiting embodiments are disclosed; however, one of ordinary skill in the art would recognize that various modifications and variations in light of the above teachings will fall within the scope of the appended claims. It is therefore understood that within the scope of the appended claims, the disclosure may be practiced other than as specifically described. For this reason, the appended claims should be studied to determine true scope and content.

What is claimed is:

1. A fastener assembly for a gas turbine engine, comprising:
a first body including a first surface, a bottom surface and a side face spanning between the first and bottom surfaces, and wherein the first surface, the bottom surface and the side face define a recess in the first body;
a second body engaging the first body;
a shank engaged with the first and second bodies and including opposite first and second end portions with the first end portion disposed in the recess and the second end portion engaged to the second body;
an enlarged head engaged to the first end portion and disposed in the recess; and
a filler disposed in the recess and engaged with the first body, the first end portion, and the enlarged head, and wherein the disposed filler has an outer surface that spans an opening of the recess so that the disposed filler is oriented flush with the first surface such that the disposed filler further coveringly overlies both the enlarged head and the first end portion disposed in the recess,
wherein the first body is a rotor.

2. The fastener assembly set forth in claim 1, wherein the second body is a balancing weight.

3. The fastener assembly set forth in claim 1, wherein the enlarged head is a nut in contact with the bottom surface and the first end portion is threaded.

4. The fastener assembly set forth in claim 1, wherein a hole in the first body extends through the bottom surface and communicates with the recess, and the shank extends through the hole.

5. The fastener assembly set forth in claim 1 further comprising:
a second enlarged head engaged to the second end portion, and wherein a portion of the second body is located between and in contact with the second enlarged head and the first body.

6. The fastener assembly set forth in claim 5, wherein the second body is a balancing weight.

7. A rotor disc comprising:
a first surface defining in-part an air cavity through which the rotor disc rotates;
a second surface recessed from the first surface with a hole in the rotor disc that extends through the second surface;
a shank extending through the hole and having a first end portion disposed between the first and second surfaces and an opposite second end portion;
a body engaged to the second end portion;
an enlarged head engaged to the first end portion and disposed between the first and second surfaces; and
a filler disposed between the first and second surfaces, covering the enlarged head and the first end portion, and having an outer surface orientated flush with the first surface and defining in-part the air cavity.

8. The rotor disc set forth in claim 7, wherein the body is a balancing weight.

9. The rotor disc set forth in claim 7 further comprising:
a side face spanning between the first and second surfaces, and wherein a recess in the rotor is defined by the second surface and the side face.

10. The rotor disc set forth in claim 9, wherein the side face is circumferentially continuous with respect to a centerline of the hole.

11. The rotor disc set forth in claim 7, wherein the filler is removable.

12. A method of assembling a fastener assembly for a gas turbine engine comprising the steps of:
locating a first end portion of a shank into a recess in a first body of the gas turbine engine;
attaching an enlarged head to the first end portion and disposing the enlarged head in the recess;
engaging a second end portion of the shank, opposite the first end portion, to a second body of the gas turbine engine; and
disposing a filler within the recess such that the disposed filler coveringly overlies the enlarged head and the first end portion disposed in the recess and the disposed filler is engaged with the first body, the first end portion, and the enlarged head,
wherein the first body includes a first surface, a bottom surface, and a side face spanning between the first and bottom surfaces and the recess is defined by the bottom surface and the side face,
wherein the disposed filler has an outer surface that spans an opening of the recess so that the disposed filler is oriented flush with the first surface; and
wherein the first body is a rotor.

13. The method set forth in claim 12, wherein a distal end of the second end portion of the shaft is not positioned in the recess.

* * * * *